United States Patent
Vollmer et al.

(10) Patent No.: US 11,827,544 B2
(45) Date of Patent: Nov. 28, 2023

(54) CATALYST-FREE METHOD FOR DEGRADING DIOXANE IN ALKYL ETHER SULFATE VACUUM REMOVAL WATER

(71) Applicant: Stepan Company, Northbrook, IL (US)

(72) Inventors: Matthew V. Vollmer, Ballwin, MO (US); Donald E. Oulman, Durham, NC (US); Aaron Brown, Northbrook, IL (US); Dennis Smith, Pittsburg, CA (US); Doug Gustafson, Pittsburg, CA (US); Terry Applebury, Pittsburg, CA (US)

(73) Assignee: Stepan Company, Northbrook, IL (US)

(*) Notice: Subject to any disclaimer, the term of this patent is extended or adjusted under 35 U.S.C. 154(b) by 7 days.

(21) Appl. No.: 18/078,251

(22) Filed: Dec. 9, 2022

(65) Prior Publication Data
US 2023/0116436 A1    Apr. 13, 2023

Related U.S. Application Data

(63) Continuation of application No. PCT/US2022/033265, filed on Jun. 13, 2022.
(Continued)

(51) Int. Cl.
*C02F 1/72* (2023.01)
*C02F 1/02* (2023.01)
(Continued)

(52) U.S. Cl.
CPC ............ *C02F 1/722* (2013.01); *C02F 1/025* (2013.01); *C02F 1/285* (2013.01); *C02F 1/42* (2013.01);
(Continued)

(58) Field of Classification Search
CPC ...... C02F 1/72; C02F 1/78; C02F 1/48; C02F 1/02
See application file for complete search history.

(56) References Cited

U.S. PATENT DOCUMENTS

| 5,851,407 A | 12/1998 | Bowman et al. |
| 5,868,937 A | 2/1999 | Back et al. |
| (Continued) | | |

FOREIGN PATENT DOCUMENTS

| CN | 103723816 | 7/2015 |
| JP | 5510004 | 6/2014 |
| (Continued) | | |

OTHER PUBLICATIONS

Method and Apparatus for Treating 1,4-Dioxane in Waste Water, Isaka Kazuichi; Dec. 13, 2012 (Year: 2013).*

(Continued)

*Primary Examiner* — Walter D. Griffin
*Assistant Examiner* — Cameron J Allen
(74) *Attorney, Agent, or Firm* — McAndrews, Held & Malloy, Ltd.

(57) ABSTRACT

A method of degrading 1,4-dioxane in the wastewater produced during the manufacture of alkyl ether sulfates is disclosed. The method includes the steps of (a) mixing from 100 to 10,000 ppm, preferably 1,000 to 4,000 ppm of ozone with the wastewater; (b) introducing $H_2O_2$ into the wastewater in an amount of 0.01 to 10, preferably 0.1 to 0.5 molar equivalents of $H_2O_2$ to ozone, and (c) mixing the ozone, $H_2O_2$, and wastewater to generate hydroxyl radicals reactive with the 1,4-dioxane, without the addition of a metal catalyst. The hydroxyl radicals react with the 1,4-dioxane and degrade it into carbon dioxide, water and/or carbonate. The method is effective to reduce a concentration of 1,4-dioxane in the wastewater from a range of about 10 ppm to about (Continued)

1000 ppm of dioxane down to less than 5 ppb of 1,4-dioxane after treatment. The method is also effective for removing hydrocarbon species that may be present in the wastewater.

21 Claims, 3 Drawing Sheets

Related U.S. Application Data

(60) Provisional application No. 63/348,768, filed on Jun. 3, 2022, provisional application No. 63/210,360, filed on Jun. 14, 2021.

(51) Int. Cl.
  *C02F 1/28* (2023.01)
  *C02F 1/42* (2023.01)
  *C02F 1/78* (2023.01)
  *C02F 101/32* (2006.01)
  *C02F 101/34* (2006.01)
  *C02F 103/36* (2006.01)

(52) U.S. Cl.
  CPC ............ *C02F 1/78* (2013.01); *C02F 2101/32* (2013.01); *C02F 2101/34* (2013.01); *C02F 2101/40* (2013.01); *C02F 2103/36* (2013.01); *C02F 2305/023* (2013.01)

(56) References Cited

U.S. PATENT DOCUMENTS

| | | |
|---|---|---|
| 6,024,882 A | 2/2000 | McNeilly et al. |
| 7,264,419 B2 | 9/2007 | Bowman et al. |
| 7,927,494 B2 | 4/2011 | Ikematsu et al. |
| 8,225,856 B2 | 7/2012 | Kerfoot |
| 2002/0006366 A1 | 1/2002 | Borgstrom |
| 2002/0063088 A1 | 5/2002 | Hidaka et al. |
| 2008/0290045 A1 | 11/2008 | Robinson et al. |
| 2010/0320156 A1 | 12/2010 | Olaiya et al. |

FOREIGN PATENT DOCUMENTS

| | | |
|---|---|---|
| JP | 2014117647 | 6/2014 |
| JP | 2014161749 | 9/2014 |

OTHER PUBLICATIONS

Schouten et al., Selection and evaluation of adsorbents for the removal of anionic surfactants from laundry rinsing water, Water Research, vol. 41, 2007, 9 pages.

Yamamoto et al., Field Test of On-Site Treatment of 1,4-Dioxane-Contaminated Groundwater Using *Pseudonocardia* sp. D17, Journal of Water and Environment Technology, vol. 10, Dec. 10, 2018, 13 pages.

Adam et al., Oxidation and Biodegradability Enhancement of 1,4-Dioxane Using Hydrogen Peroxide and Ozone, Environ. Sci. Technology, vol. 28, No. 11, 1994, 7 pages.

International Searching Authority, International Search Report and Written Opinion, application No. PCT/US22/33265, dated Sep. 13, 2022, 4 pages.

* cited by examiner

CATALYST-FREE METHOD FOR DEGRADING DIOXANE IN ALKYL ETHER SULFATE VACUUM REMOVAL WATER

CROSS REFERENCE TO RELATED APPLICATIONS

This application is a continuation of PCT Application No. PCT/US22/33265 filed Jun. 13, 2022, which claims priority to U.S. Provisional Application No. 63/348,768, filed Jun. 3, 2022 and U.S. Provisional Application No. 63/210,360, filed Jun. 14, 2021. The entire specifications of the provisional applications referred to above are hereby incorporated by reference.

FIELD OF THE INVENTION

The present technology relates generally to methods for mitigating or degrading contaminants in water. More particularly, the present technology relates to a method for degrading contaminants, such as 1,4-dioxane (dioxane), in industrial process wastewater.

BACKGROUND OF THE INVENTION

Dioxane contaminants, such as 1,4-dioxane, have increasingly come under scrutiny, as both the EPA and REACh have respectively acknowledged dioxane as "likely to be carcinogenic to humans," and "a substance of very high concern." New legislation requires that many manufacturers of consumer products meet prescribed limits of dioxane. As a result, manufacturers of raw materials used in the manufacture of consumer products are under increasing pressure to remove any dioxane contaminants generated during manufacture of the raw materials.

In the production process of detergent surfactants, particularly fatty alcohol polyoxymethylene ether sulfates (AES), mitigation steps are employed to remove 1,4-dioxane from the AES during production. For example, U.S. Pat. No. 8,865,928 discloses a vacuum distillation process for removing dioxane from the sulfate surfactant. However, removing dioxane to the new levels permissible by regulatory agencies generates a large volume of aqueous byproduct waste stream that contains the removed dioxane contaminant. As much as 0.5-1.0 lb. of AES wastewater per lb. of product can be generated from production of the AES product. The content of dioxane in AES wastewater can be as high as 1000 mg/L, and the residual total organic carbon (TOC) content can be as high as 500 mg/L. The AES wastewater must be treated to remove the dioxane before the wastewater can be discharged into the environment or, more preferably, reused.

Dioxane (molecular weight 88.11 g/mol) is a colorless and volatile organic liquid of the formula C4H8O2 with a boiling point of 101.3° C. It is a hydrophilic molecule and is miscible with water in all proportions, making direct removal from aqueous systems more complicated. Moreover, it does not possess easily hydrolyzable groups in its molecular structure, nor does it absorb visible wavelength radiation. These traits allow dioxane to permeate through the soil, water, and atmosphere with ease if directly discharged into the environment.

Owing to significant water miscibility, degradation of aqueous dioxane solutions is primarily limited to biodegradation, adsorption, and chemical oxidation methods. Biodegradation methods are time-consuming, poorly effective, and non-trivial to operate. Adsorption methods are effective, but yield higher concentration dioxane waste streams that still require further processing to either recover the dioxane or degrade the dioxane by other means. Chemical oxidation methods, such as the iron-catalyzed Fenton process, typically suffer from the presence of catalysts, which complicate the re-use of the water remaining after dioxane degradation and generate a heavy metal solid waste stream that requires disposal.

Chemical oxidation methods employing ozone and peroxide have been used to degrade contaminants in ground water. However, contaminated ground water may have concentrations of dioxane on the order of micrograms per liter. By contrast, the concentration of dioxane in AES wastewater can be up to 1000 mg/L with a total organic carbon content (TOC) level of 500 ppm. The volume of wastewater is related to the production rate of AES product, and can be as much as 60,000 gallons per day (113,562 L) or more. Degrading such high concentrations of dioxane requires high concentrations of ozone and/or hydrogen peroxide, and typically a metal catalyst is employed to enhance the rate of degradation. For example, Chinese Patent No. CN 103723816 discloses a method and device for continuously degrading dioxane from vacuum removal water from AES production. The three-step method employs a pre-oxidizer for mixing hydrogen peroxide and the vacuum removal water with ozone for a pre-oxidation reaction, then mixing the pre-oxidized vacuum removal water in a mixer at elevated temperatures of 40° C.-60° C. with additional ozone for a preliminary degradation, followed by adding a catalyst to the degraded liquid in a catalytic oxidizer with further addition of ozone. Although the patent discloses that about 97% of the dioxane can be degraded, the process requires a metal catalyst, thereby complicating re-use of the water. In addition, the process utilizes three separate reactors: a pre-oxidizer, a mixer, and a catalytic oxidizer, which make the process cumbersome and inefficient.

Therefore, there is an urgent need for a method to reduce dioxane in wastewater streams such that its proliferation into the environment is inhibited and the resulting product water is rendered suitable for other uses. There is also an urgent need for a method for reducing dioxane in wastewater streams that can achieve a high dioxane degradation rate, such as at least 98%, yet is simple, cost-effective, and easily operated.

SUMMARY OF THE INVENTION

In one aspect, the present technology relates to a method of degrading 1,4-dioxane in the wastewater produced during the manufacture of alkyl ether sulfates. Such wastewater may contain from about 10 ppm to about 1000 ppm of dioxane. The method includes the steps of (a) mixing from 100 to 10,000 ppm, preferably 1,000 to 4,000 ppm of ozone with the wastewater; (b) introducing $H_2O_2$ into the wastewater in an amount of to 10 molar equivalents, preferably 0.1 to 0.5 molar equivalents of $H_2O_2$ to ozone, and (c) mixing the ozone, $H_2O_2$, and wastewater to generate hydroxyl radicals reactive with the 1,4-dioxane, without the addition of a metal catalyst and preferably at ambient temperature. The hydroxyl radicals react with the 1,4-dioxane to degrade the 1,4-dioxane into water, carbon dioxide and/or carbonate. After treatment, surprisingly, the wastewater contains less than 5 ppb of 1,4-dioxane. The method is also effective for removing hydrocarbon species that may be present in the wastewater. Because no metal catalyst is employed, the treated wastewater may be re-used in other processes without further treatment.

DETAILED DESCRIPTION OF THE INVENTION

While the presently described technology will be described in connection with one or more preferred embodiments, it will be understood by those skilled in the art that the technology is not limited to only those particular embodiments. To the contrary, the presently described technology includes all alternatives, modifications, and equivalents that can be included within the spirit and scope of the appended claims.

The present technology generally relates to a method of treating AES wastewater to remove dioxane. The method comprises treating the AES wastewater with a combination of ozone ($O_3$) and hydrogen peroxide ($H_2O_2$), without the need for a catalyst. The resulting treated water is sufficiently free from organic and inorganic species that it may be reusable as industrial process water in any number of suitable embodiments.

The process of the present technology works on the principle that ozone in combination with $H_2O_2$ can generate hydroxyl radicals. The hydroxyl radicals are very reactive, and react with the dioxane to produce carbon dioxide and water as degradation products via radical hydrogen atom abstraction reactions. The carbon dioxide and water may ultimately be mineralized into carbonate in the presence of metal ions. When the hydroxyl radicals are generated by means of a ferrous salt, such a mixture is commonly referred to as the "Fenton Reagent," and is commonly employed to destroy organic compounds.

Process schemes for the reactions are shown below:
Ozone Generation Reactions

$$3O_2 \rightarrow 2O_3$$

Ozonolysis Reactions pertinent to generation of hydroxyl radicals

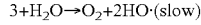
$$3+H_2O \rightarrow O_2+2HO\cdot (slow)$$

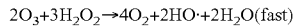
$$2O_3+3H_2O_2 \rightarrow 4O_2+2HO\cdot+2H_2O(fast)$$

Degradation of Dioxane Reaction

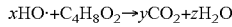
$$xHO\cdot+C_4H_8O_2 \rightarrow yCO_2+zH_2O$$

Degradation of Hydrocarbons

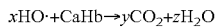
$$xHO\cdot+CaHb \rightarrow yCO_2+zH_2O$$

The process of removing dioxane from AES generates a wastewater stream containing appreciable concentrations of dioxane, as well as total organic carbon (TOC) impurities. The AES wastewater stream may have a concentration of dioxane of between ppm and 1000 ppm. The non-dioxane concentration of TOC may be in the range of to 250 ppm or higher. The TOC is primarily composed of isomeric hydrocarbons and olenfinic compounds containing from 6 to 40 carbon atoms, but may also include AES surfactants. The amount of dioxane and TOC in the wastewater can be estimated from the vacuum removal procedure for removing the dioxane from the AES.

Figure 1:
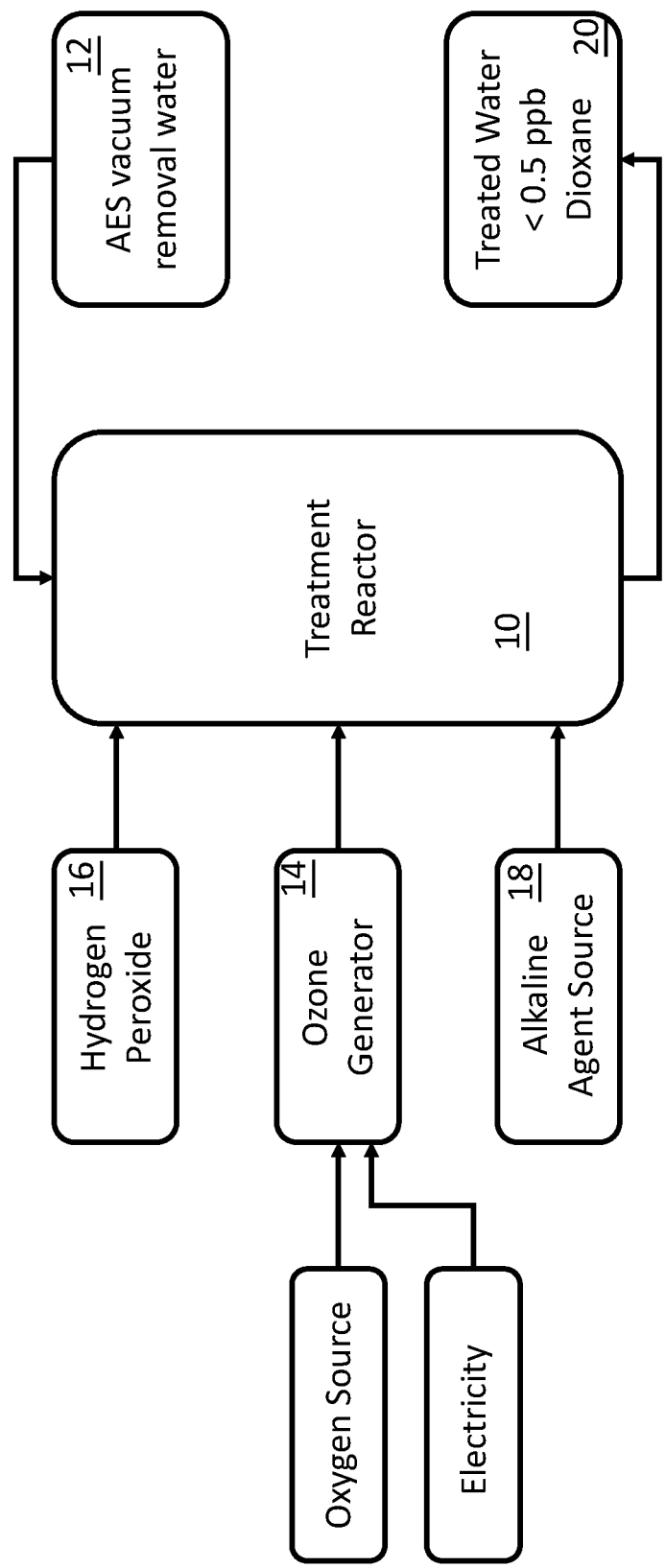
FIG. 1 is a schematic view of the process of the present technology.

A process scheme for carrying out the wastewater treatment process of the present technology is shown in FIG. 1. The AES wastewater stream 12 is transferred to a reactor 10 for treatment to remove the dioxane and TOC. In some embodiments, the AES wastewater is first collected in a feed tank, which allows for the accumulation of the wastewater to be treated. When a desired quantity of wastewater has been collected in the feed tank, the wastewater can be pumped into the reactor.

In the reactor, the wastewater is agitated, and ozone is added and mixed with the wastewater. The amount of ozone and hydrogen peroxide added to the reactor will depend, at least in part, on the amount of estimated dioxane and TOC in the wastewater. The dosage of ozone needed for the degradation of the dioxane and TOC can be calculated from the estimated amounts of dioxane and TOC in the wastewater. In general, ozone is added to the reactor in an amount of about 100 ppm to about 10,000 ppm, alternatively about 500 ppm to about 5,000 ppm, alternatively about 1000 ppm to about 4000 ppm. The ozone can be added to the reactor through multiple injection ports, and at pressures above atmospheric pressure, to insure thorough mixing and absorption, and solubilization into the wastewater.

Ozone for use in the degradation process can be generated by an ozone generator 14 from oxygen by any number of methods known in the art. Such methods include UV-light photo production, cold plasma, or corona discharge techniques. In one embodiment, ozone is generated via electrolysis of oxygen and recombination of resultant oxygen atoms. With recent advances in the art, the concentration of ozone in the oxygen stream may be as high as 20%. One example of an ozone generator useful for producing ozone is disclosed in U.S. Published Application No. 20020006366 to Lindstrom. The oxygen stream can be sourced from a refrigerated liquid oxygen tank, or alternatively could come from technologies that incorporate pressure swing adsorption for on-demand oxygen generation.

Hydrogen peroxide is added to the reactor from a hydrogen peroxide source 16 in an amount sufficient to provide a molar ratio of about 0.01 to about 10 equivalents, alternatively about 0.1 to about 0.5 equivalents of peroxide per equivalent of ozone. The peroxide and ozone are intimately mixed with the wastewater and generate the hydroxyl radicals needed to react with and degrade the dioxane and TOC present in the wastewater. The temperature of the reactor during the treatment process is not critical for the degradation of the dioxane and TOC. The temperature may be in the range of about 10° C. to about 90° C., alternatively about 20° C. to about 60° C., alternatively about to about 40° C., preferably about 20° C. to about 25° C., and treatment pressures may be in the range of about 0.01 MPa to about 1.5 MPa, alternatively about 0.1 MPa to about MPa. Progress of the degradation can be measured by any means known in the art, such as, but not limited to, GC-FID, GC-MS, TOC measurements, chemical oxygen demand, or related analytical techniques.

Prior to the addition of ozone, it may be desirable to adjust the pH of the wastewater in the reactor to a pH of about 4 to about 12, preferably to a pH of 7 or above, such as a pH in the range of about 7 to about 12, alternatively about 7 to about 11, alternatively about 7 to about 10, alternatively about 7 to about 9, alternatively about 7.5 to about 9. This can be accomplished by adding an alkaline source 18 to the wastewater in an amount sufficient to raise the pH to the desired pH, such as a pH of about 7 to about 9. The alkaline source can be any number of bases, such as NaOH, KOH, $Na_2CO_3$, $NaHCO_3$, $K_2CO_3$, $KHCO_3$, or other suitable base. An alkaline environment can decrease the stability of the hydroxyl radicals, thereby enhancing the reaction with dioxane and TOC species. The pH of the wastewater can be monitored throughout the treatment process, and additional base can be added during the process if needed to maintain the pH in the desired range.

Dioxane is more reactive than some of the other TOC species toward hydroxyl radicals, and olefinic hydrocarbon compounds in the TOC are more reactive than saturated hydrocarbons, which are minimally reactive to hydroxyl radicals. Thus, hydroxyl radicals react preferentially with the more reactive dioxane species than some of the other TOC. The treatment process of the present technology can degrade at least 98% of the dioxane initially present in the wastewater, and in some embodiments, the level of dioxane destruction can exceed 99.99%. The amount of dioxane in the treated wastewater stream 20 can be 0.5 ppb or less. Hydrocarbon compounds also react with the hydroxyl radicals and are degraded, thereby also reducing TOC in the treated wastewater stream 20. In some embodiments, the TOC may be destroyed to a level of 5 ppm or below in the treated wastewater.

The treatment process of the present technology may be conducted as a batch process or a continuous process. Although a continuous process can be more convenient, a batch process may be more effective for incorporating the ozone into the wastewater to be treated. The concentration of ozone utilized in the present process (preferably 1000 to 4000 ppm) is much higher than that used in prior art processes, which is typically no higher than 100 ppm. The use of a batch method can enhance the delivery and dissolution of the ozone gas into the wastewater, which in turn enhances the level of destruction of the dioxane in the wastewater.

Figure 2:
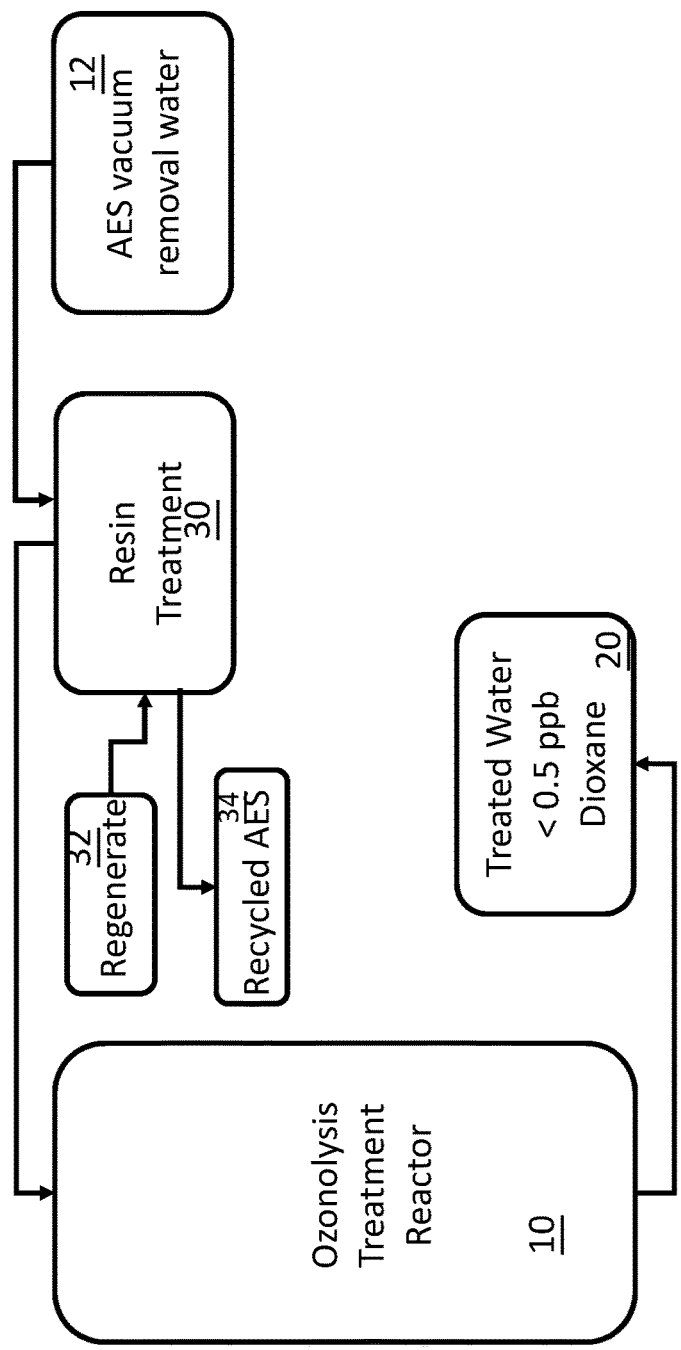
FIG. 2 is a schematic view of an embodiment of the present technology employing an ion exchange unit.

In some embodiments, it may be beneficial to remove at least some of the TOC from the wastewater stream prior to pumping the wastewater stream into the reactor. Removing TOC from the wastewater prior to the ozone/peroxide treatment can be advantageous because fewer hydrocarbons will then be available in the wastewater to react with the hydroxyl radicals, leaving more hydroxyl radicals available to react with the dioxane. Removal of the TOC can be accomplished in different ways. In one embodiment, shown in FIG. 2, the wastewater stream is cycled through a resin system 30 to remove AES surfactants and other organic materials in the wastewater stream. The resin system could be an anion exchange resin system that relies on ionic interaction to adsorb AES surfactants on positively charged adsorbents. Examples of exchange resins that could be used include polyacrylic or polystyrenic anionic exchange resins, including but not limited to, the chloride form and OH form. Alternatively, instead of ion exchange resins, a polymeric adsorbent resin that derives adsorptive properties from a macroporous structure, such as an XAD-type resin, could be used to adsorb and remove AES surfactants and other organic materials from the wastewater.

When the adsorptive capacity of the resin system drops, the resin system can be regenerated by passing a regeneration solution 32 through the resin system. The regeneration solution supplies negative ions that displace the adsorbed AES surfactants, allowing the displaced AES surfactants 34 to be collected and recycled for other uses. Examples of regeneration solutions that can be used for regenerating the resin system include, but are not limited to, NaCl, NaOH, or a combination thereof.

Figure 3:
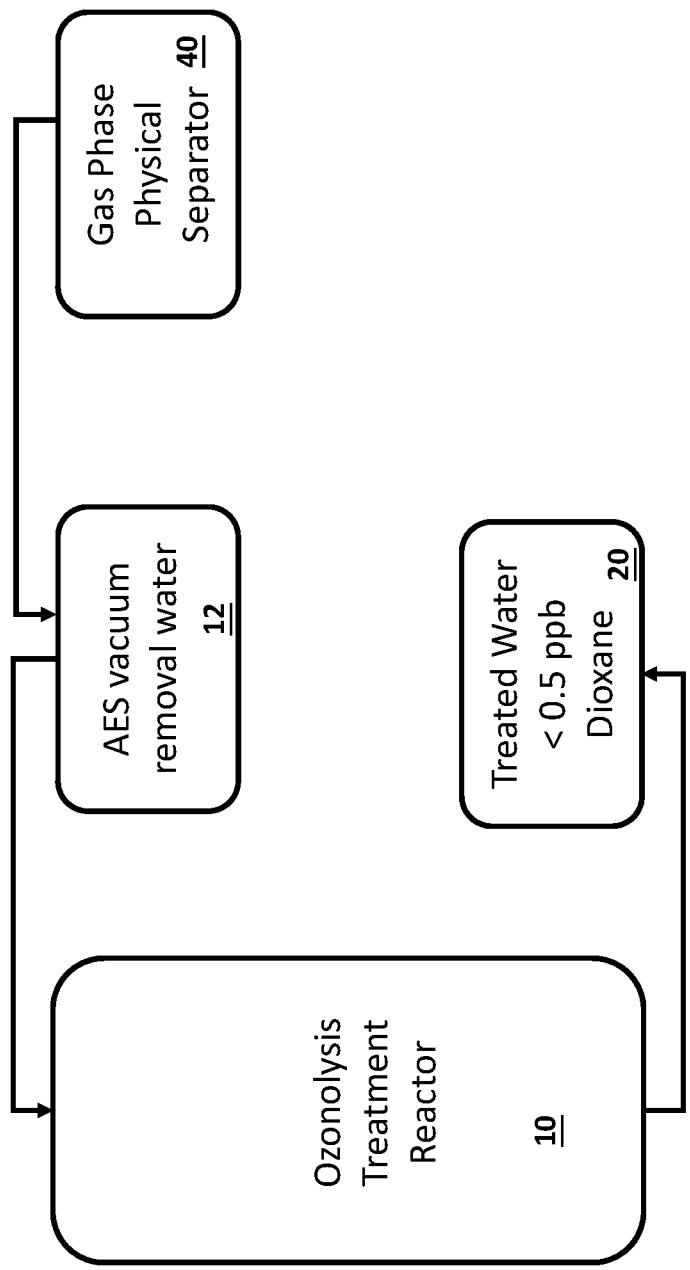
FIG. 3 is a schematic view of an embodiment of the present technology employing a gas phase liquid separator.

It is also contemplated that the AES surfactants and other organic material could be physically removed prior to pumping the wastewater stream into the reactor. FIG. 3 illustrates an embodiment in which a gas phase separator 40 is added to a dioxane vacuum distillation unit upstream from the location of discharge of the AES wastewater. Surprisingly, it has been found that the condensate from a vacuum distillation process for removing dioxane from the sulfate surfactant can also contain AES surfactants. Driving the steam/condensate resulting from vacuum distillation through the gas phase separator 40 can remove AES surfactants from the condensate. The gas phase separator relies on a centrifugal force to push particulate AES surfactants and other organic carbons to the walls of the separator, and allows only the vapor phase to continue to the condensing system of the vacuum distillation unit. The wastewater stream from the condensing system can then be pumped to the reactor for treatment with ozone and peroxide. In the gas phase separator, the AES surfactants and other organic material flow down the walls and can be circulated back to the vacuum distillation unit or collected.

Another way AES surfactants can be removed from the condensate from the vacuum distillation process is by intentionally hydrolyzing the AES surfactants in the condensate. In the hydrolysis process, the condensate containing the AES surfactants is heated to a temperature of about 180° C. (356° F.) or less, such as 90° C. (194° F.) to 180° C. (356° F.), under either acidic or basic conditions, preferably basic conditions. Such heat treatment causes the AES surfactants to hydrolyze and form sodium sulfate and the backbone alkyl ethoxylate. The sodium sulfate stays in the aqueous phase while the alkyl ethoxylate, being hydrophobic, phase separates and floats to the top of the aqueous phase. The alkyl ethoxylate can then be removed via standard decantation techniques. After the alkyl ethoxylate is removed, the aqueous phase can be then be pumped to the reactor for further treatment with ozone and peroxide.

The treatment process of the present technology provides several benefits. The process is simple and cost-effective, since the degradation occurs in one reactor at ambient temperature and no catalyst is required. Since the process does not utilize a metal catalyst for the degradation of the dioxane and TOC, the process offers the possibility of re-using the treated wastewater without the need for further treatment to remove the catalyst. Moreover, the wastewater treated by the present process is sufficiently free of dioxane to enable re-use of the wastewater in other processes. For example, in some embodiments, the water could be used as makeup water for cooling towers, as dilution water in AES solutions, or introduced into steam boiler makeup water. If permitted, the treated wastewater could be discharged into bodies of water since the level of dioxane may be below the threshold level permitted.

Definitions

"About" means +/−10% of the referenced value. In certain embodiments, about means +/−5% of the referenced value, or +/−4% of the referenced value, or +/−3% of the referenced value, or +/−3% of the referenced value, or +/−2% of the referenced value, or +/−1% of the referenced value.

Unless otherwise defined, all technical and scientific terms used herein have the same meaning as commonly understood by one of ordinary skill in the art to which this invention pertains. All references mentioned herein, including publications, patent applications, and patents, are incorporated by reference in their entirety. In addition, the following examples are only illustrative and not intended to be limiting.

EXAMPLES

The presently described technology and its advantages will be better understood by reference to the following examples. These examples are provided to describe specific embodiments of the present technology. By providing these examples, the inventors do not limit the scope and spirit of the present technology.

Example 1

Samples of wastewater from the production of AES were diluted by a factor of two with water to obtain an initial value of about 400 ppm of 1,4-dioxane. The diluted samples also contained about 250 ppm of TOC content. The samples were treated with ozone and peroxide using a HiPOx system provided by APTwater, Inc., Pittsburgh, California. Ozone concentrations for the treatments were 1000 ppm, 2000 ppm and 4000 ppm. Treatment using the HiPOx system and 1000 ppm of ozone reduced the 1,4-dioxane level in the sample to 1.9 ppm, treatment with 2000 ppm ozone reduced 1,4-dioxane level to less than 0.01 ppm and treatment with 4000 ppm ozone reduced the 1,4 dioxane level to less than 0.5 ppb. Treatment with the HiPOx system also reduced the TOC content of the wastewater. Treatment using the HiPOx system and 2000 ppm of ozone reduced the TOC content to less than 80 ppm.

The present technology is now described in such full, clear, concise, and exact terms as to enable any person skilled in the art to which it pertains, to practice the same. It is to be understood that the foregoing describes preferred embodiments of the invention and that modifications may be made therein without departing from the spirit or scope of the invention as set forth in the appended claims.

What is claimed is:

1. A method of degrading 1,4-dioxane in wastewater produced during production of alkyl ether sulfates, the method comprising:
   (a) mixing from 100 to 10,000 ppm of ozone with the wastewater produced during production of alkyl ether sulfates;
   (b) introducing $H_2O_2$ into the wastewater in an amount of 0.01 to 10.0 molar equivalents of $H_2O_2$ to ozone, and
   (c) mixing the ozone, $H_2O_2$, and wastewater to generate hydroxyl radicals reactive with the 1,4-dioxane, without addition of a catalyst;
   wherein the hydroxyl radicals react with the 1,4-dioxane to degrade the 1,4-dioxane such that after step (c), the wastewater contains about 5 ppb or less of 1,4-dioxane.

2. The method of claim 1, wherein the wastewater contains between and 1,000 ppm of 1,4-dioxane prior to step (a).

3. The method of claim 1, wherein steps (a) to (c) are conducted at 1,000 to 4,000 ppm of ozone with the wastewater.

4. The method of claim 1, wherein steps (a) to (c) are conducted at to 0.5 molar equivalents of $H_2O_2$ to ozone.

5. The method of claim 1, wherein steps (a) to (c) are conducted at a pressure of about 0.01 MPa to about 1.5 MPa.

6. The method of claim 1, wherein steps (a) to (c) are conducted at a temperature of about 10° C. to about 90° C.

7. The method of claim 1, wherein steps (a) to (c) are conducted at a temperature of about 20° C. to about 25° C.

8. The method of claim 1, wherein an alkaline agent source is added to the wastewater prior to step (a) to adjust the pH of the wastewater to a pH of about 4 to about 12.

9. The method of claim 1, wherein an alkaline agent source is added to the wastewater at any of steps (a) to (c) to maintain the pH of the wastewater at a pH of about 4 to about 12.

10. The method of claim 9, wherein the pH of the wastewater is maintained at a pH of about 7 to about 9.

11. The method of claim 1, wherein steps (a) to (c) are conducted in one reactor.

12. The method of claim 11, wherein the method is conducted as a batch process.

13. The method of claim 11, wherein the method is conducted as a continuous process.

14. The method of claim 1, wherein at least 98% of the 1,4-dioxane present in the wastewater prior to step (a) is degraded.

15. The method of claim 1, wherein the wastewater produced during production of alkyl ether sulfates also contains hydrocarbon compounds, and at least some of the hydrocarbon compounds react with the hydroxyl radicals to degrade the hydrocarbons compounds, such that after step (c), the wastewater contains about 5 ppm or less of the hydrocarbon compounds.

16. The method of claim 15, further comprising the step of removing at least a portion of the hydrocarbon compounds from the wastewater prior to step (a).

17. The method of claim 16, wherein removing at least a portion of the hydrocarbon compounds prior to step (a) is accomplished by cycling the wastewater through an ionic exchange resin or a polymeric adsorptive resin.

18. The method of claim 17, wherein the hydrocarbon compounds include alkyl ether sulfate surfactants, and the wastewater is cycled through an ionic exchange resin selective for removing the alkyl ether sulfate surfactants.

19. The method of claim 16 wherein removing at least a portion of the hydrocarbon compounds prior to step (a) is accomplished by heating the hydrocarbon compounds to a temperature in the range of 90° C. to 180° C. under acidic or basic conditions to hydrolyze the hydrocarbon compounds.

20. The method of claim 15, further comprising the step of physically removing at least a portion of the hydrocarbon compounds prior to step (a).

21. The method of claim 20, wherein physical removal of the hydrocarbon compounds is accomplished by a gas phase separator.

* * * * *